H. W. HILL.
BIFOCAL.
APPLICATION FILED MAR. 8, 1920.
1,400,061.
Patented Dec. 13, 1921.
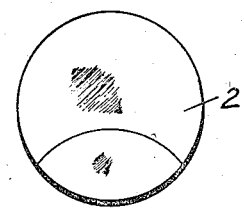
Fig. I
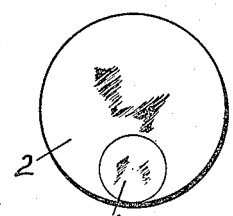
Prior Art.
Fig. II
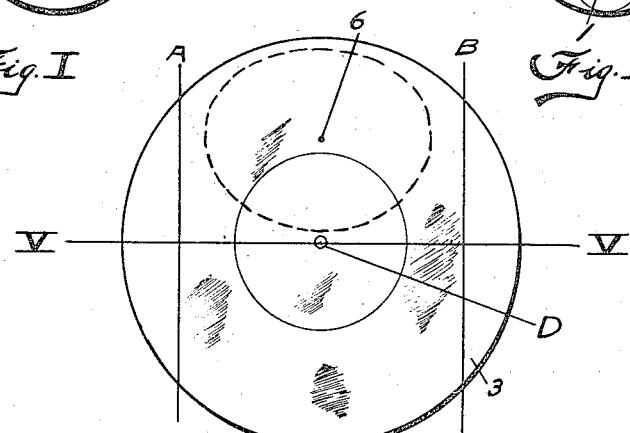
Fig. III
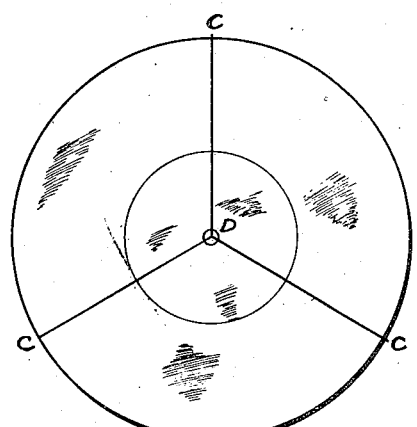
Fig. IV
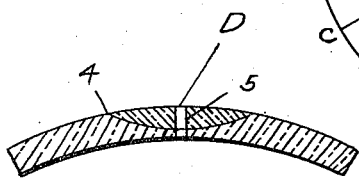
Fig. V
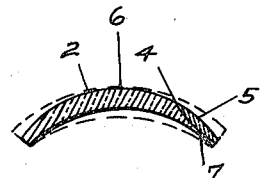
Fig. VI
INVENTOR
HARRY W. HILL
BY
H. H. Styll & H. H. Parsons
ATTORNEYS

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BIFOCAL.

1,400,061.  Specification of Letters Patent.  Patented Dec. 13, 1921.

Application filed March 8, 1920. Serial No. 363,929.

*To all whom it may concern:*

Be it known that I, HARRY W. HILL, a citizen of the United States, residing at Southbridge, in the county of Worcester and State of Massachusetts, have invented certain new and useful Improvements in Bifocals, of which the following is a specification.

This invention relates to improvements in bifocals and has particular reference to bifocals of the two part type in which the difference in focus of the upper and lower portions of the lens is secured by embedment or insertion in one lens of a portion having a different index of refraction.

The principal object of the present invention is the provision of a novel and improved process of constructing lenses of this character which shall very much reduce the initial cost of production and which shall at the same time produce a lens having a larger lateral field of vision through the reading portion than has been possible with the hitherto employed types.

Other objects and advantages of my improved process should be readily apparent by reference to the following specification taken in connection with the accompanying drawings, and it will be understood that I may make any modifications in the specific features disclosed within the scope of the appended claims without departing from or exceeding the spirit of my invention.

Figure I represents a front view of a completed lens shown as cut in circular form and embodying my improvements.

Fig. II represents a similar view of a prior art lens.

Fig. III represents a plan view of one manner of constructing the lens in question.

Fig. IV represents a plan view of another form thereof.

Fig. V represents a sectional view as on the line V—V of Fig. III.

Fig. VI represents a sectional view at right angles to Fig. V.

Previous to my present invention it has been customary in the construction of lenses of this type which at the present day are mostly what is known as fused bifocal lenses, that is to say, lenses in which the segment 1 is secured to the base section 2 by fusion to form in the base portion 2 a slight countersink, and fuse therein the button 1 of glass having a different index of refraction. This has hitherto always been an individual manufacturing proposition, it being possible to produce but a single lens at a time and therefore making the cost of these lenses quite high. At the same time they have been limited as to the field of vision through the reading portion, as should be understood by reference to Fig. II.

It is the purpose of my present invention to obviate both of these prior art difficulties, in that I make it possible to secure two or three lenses at a time from the same grinding and fusion operations in place of but a single lens, and also make it possible to furnish a lens having a much wider field of vision through the reading portion.

In the accomplishment of this result, as illustrated in connection with Figs. III, IV and V, I make use of the large disk or blank 3 and form centrally therein in place of at one edge thereof a countersink as at 4, in which I secure the large segment 5 preferably of flint glass, having a very high index of refraction, the object of this being that with a higher index of refraction less depth of curve is required to give a different variation in power than with the lower index and thus the depth of the countersink is more limited. In the carrying out of my improved process the segment having been suitably secured in position, I preferably split the blank either along the line V—V to make a pair of blanks from it, as is indicated in connection with Fig. III, or along the lines C—D to make three lenses from the single blank, as is indicated in connection with Fig. IV. In either event the united parts are so split as to provide a plurality of segments or sectors, each embodying an upper or distant vision field and a lower or near vision field. The blanks, if in the form of Fig. III, are preferably also cut as on the lines A—A and B—B to remove the excess stock not required in the finished lens.

It will thus be seen that by the use of my improved process I am able with a single grinding and fusing operation to produce a plurality of lenses in place of a single lens at a time as has hitherto been customary, and in addition produce these lenses with a wider field of vision in the reading portion than has hitherto been possible.

In the grinding of the completed lens I preferably first split the blank as along the line V—V and then grind on the segment bearing face a convex curve having its center substantially at 6 or the center of the blank, the curve of course dropping away equally on both sides from the center 6 and coming down through the segment, as illustrated in Fig. VI, thus reducing the edge thickness of the segment and throwing the optical center of the reading portion nearer the geometrical center than would be the case if the final curve were left as the curve shown in Fig. V for example, or continuous across the entire segment.

It has been considered practically impossible to materially increase the size of the near field segment of a fused bifocal owing to the fact that the reading segment extends so far into the material of the distance segment that there is a liability of it cutting entirely through the distance portion and thus spoiling the lens as a line of separation would be clearly visible.

This can be most clearly shown in Fig. VI where it will be noticed that the thickness of the distance portion at 7 is very thin. Therefore, if the diameter of the reading segment is increased it would soon cut through the opposite side of the distance portion.

It was for this reason that the reading segments of fused bifocals were kept small, as shown in Fig. II, and it was the conception of my invention that by changing the refractive index of the glass so that I could use a more shallow curve, two or three lenses could be manufactured at a time instead of one lens at a time, as had hitherto been done, because I could use a larger segment with a shallower extension into the distance portion. The importance of this conception is that it increases the number of lenses that can be made with the same effort, thus making them more economically and at the same time from a standpoint of the consumer it increases the size of the segment and gives him a larger and wider reading portion.

A further feature of particular importance in connection with this invention is the formation of a hole or aperture in the center of the blank, as indicated at D in Figs. III, IV and V, the particular purpose of this being to interrupt the physical continuity of the blank so that the same may be most advantageously split through the segment, this feature being particularly valuable when three lenses or the like are to be cut from a single target blank, as is illustrated in connection with Fig. IV, since this feature makes it possible to split the blank in three sectors and get out three perfect lenses, a matter very difficult of accomplishment and commercially impracticable previous to my invention.

I claim:

1. The process of simultaneously forming a plurality of two part bifocal lenses consisting in forming a countersink centrally of a blank, securing a segment of different index of refraction within the countersink and subsequently splitting the blank through the countersink to provide a plurality of lens portions each having a near and a distant vision section.

2. The process of simultaneously forming a plurality of two part bifocal lenses consisting in forming a countersink centrally of a blank, securing a segment of different index of refraction within the countersink, splitting the blank through the countersink to provide a plurality of lens portions each having a near and a distant vision section, and subsequently cutting the blank thus formed into a completed lens having the original center of the countersink disposed just outside the completed lens.

3. The process of forming a two part bifocal lens having a wide near vision field, consisting in centrally forming a countersink within a lens blank, securing a button of different index of refraction within the countersink, centrally dividing the combined parts to produce a plurality of blanks each having a near and distant vision portion with the thick portion of the segment at one edge of the blank and grinding a continuous convex curve on the segment bearing face of the blank having a downward swing through the segment to reduce the edge thickness thereof, substantially as illustrated.

In testimony whereof I have affixed my signature, in presence of two witnesses.

HARRY W. HILL.

Witnesses:
 H. K. PARSONS,
 T. M. LAFLER.